(12) United States Patent
Kim et al.

(10) Patent No.: US 6,274,831 B1
(45) Date of Patent: Aug. 14, 2001

(54) MOUNTING SYSTEM FOR A SWITCH HAVING A SNAP LOCK MECHANISM

(75) Inventors: David K. J. Kim; Sven Larson, both of San Jose; Marcus Adams, Fremont, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/524,983

(22) Filed: Mar. 14, 2000

(51) Int. Cl.[7] ....................................................... H01H 9/02
(52) U.S. Cl. ........................................... 200/296; 200/329
(58) Field of Search ..................................... 200/5 R, 553, 200/293–296, 329, 339

(56) References Cited

U.S. PATENT DOCUMENTS

| | | | |
|---|---|---|---|
| 4,609,119 | * 9/1986 | Richter, Sr. | ............................. 220/3.5 |
| 4,710,599 | * 12/1987 | Motodate et al. | ................. 200/61.85 |
| 5,769,209 | * 6/1998 | Massey, III | ............................ 200/339 |
| 5,881,865 | * 3/1999 | Jang | ....................................... 200/303 |

* cited by examiner

*Primary Examiner*—Michael Friedhofer
(74) *Attorney, Agent, or Firm*—Conley, Rose & Tayon, PC; B. Noël Kivlin

(57) ABSTRACT

An electronic system may include a mounting structure that allows a switch to be firmly attached to the electronic system. The switch may have one or more snap lock mechanisms attached to a body of the switch. The mounting structure may have an opening sized to allow the switch and the snap lock mechanisms to be inserted into the mounting structure. The mounting structure may include an undercut portion in a wall of the mounting structure. The mounting panel may also include a channel configured to accept a width of the snap lock mechanism. The undercut portion of the wall may be located in a channel wall. When the switch is inserted into the mounting structure, the snap lock mechanism may engage the undercut portion of the mounting structure to securely hold the switch to the mounting structure.

20 Claims, 4 Drawing Sheets

MOUNTING SYSTEM FOR A SWITCH HAVING A SNAP LOCK MECHANISM

BACKGROUND OF THE INVENTION

1. Field of the Invention

This invention relates to mounting systems, and more particularly to a mounting structure for a switch that allows the switch to be securely attached to the mounting structure by at least one snap lock mechanism attached to a body of the switch.

2. Description of the Related Art

A switch may be used in an electronic system as a control device. For example, the switch may be a power control that turns a system on and off. A switch may be attached to an electronic system in a variety of ways. A switch may attach to a system by a snap lock mechanism or by snap lock mechanisms. Snap lock mechanisms may attach the switch to a support structure of the electronic system. Optionally, a cover may be placed over the support structure and a portion of the switch to form a part of an enclosure for the electronic system. An example of an electronic system that typically uses a cover positioned over a portion of a switch is a computer system.

A snap lock mechanism may be used to fasten a switch to an electronic system. The snap lock mechanism may be attached to a body of the switch. One type of snap lock mechanism may include a spring-like member and engaging surfaces. In a typical application of this type of snap lock mechanism, the switch is inserted into an opening in a panel. The spring-like member in an initial configuration contacts a wall of the opening during insertion. Inserting the switch into the opening in the panel may compress and alter the configuration of the spring-like member. The snap lock mechanism may be pushed into the opening until an engaging surface of the snap lock mechanism passes through a bottom surface of the panel. When an engaging surface of the snap lock mechanism passes through the bottom surface of the panel, the spring-like member may expand towards the initial configuration. An engaging surface of the snap lock mechanism may contact the bottom surface of the panel when the switch is filly inserted into the panel. The contact between the panel and the engaging surface of the snap lock mechanism may inhibit removal of the switch from the panel.

FIG. 1 shows a switch 10 that may be mounted to opening 12 in panel 14. The switch shown in FIG. 1 is a rocker switch. The phantom lines in FIG. 1 show where corners of switch 10 may be positioned when the switch is inserted into the opening 12. The switch 10 may include body 16, facing 18, actuator 20 and snap lock mechanisms 22 (only one shown). A second snap lock mechanism 22 may be located on an opposite side of the switch body 16. The snap lock mechanisms 22 may be attached to sides of the body 16. Each snap lock mechanism 22 may include a plurality of engaging surfaces 24. Each snap lock mechanism 22 may include an outermost edge 26. A cover (not shown in FIG. 1) may be placed on top of the facing 18 in some applications.

The panel 14 may have a thickness that is less than a vertical distance between bottom surface 28 of the facing 18 and the outermost edges 26 of the snap lock mechanisms 22. When the switch 10 is inserted into the opening 12 in panel 14, slanted surfaces of the snap lock mechanisms 22 may compress until the outermost edges 26 pass through the opening. When the outermost edges 26 pass through the opening 12, the slanted surfaces of the snap lock mechanisms 22 may expand towards an initial configuration. When the switch 10 is fully inserted into the opening 12, engaging surfaces 24 may contact bottom surface 30 of the panel 14. The contact between the engaging surfaces 24 and the panel 14 may inhibit removal of the switch 10 from the panel.

An opening 12 in a panel 14 for the switch 10 may have a shape that corresponds to a shape of a perimeter of the switch body 16. Typically, the opening 12 is a rectangular shape. A width of the opening 12 may be slightly larger than a width of the body 16. For example, a width of a body 16 of a switch 10 may be about 12.6 millimeters, and a width of an opening 12 for the switch may be about 13.0 millimeters.

A length of the opening 12 may be larger than a length of the body 16 so that the opening may accommodate the snap lock mechanisms 22. For example, a length of a body 16 of a switch 10 may be about 17.2 millimeters, a length between outermost edges 26 of snap lock mechanisms 22 may be about 21 millimeters, and a length of an opening 12 for the switch may be about 19.4 millimeters. The differences in lengths between the opening 12 and the switch body 16 may allow a large gap to form between walls forming the opening and the switch body. The large gap between the body 16 and walls may allow the switch 10 to move when the actuator 20 is activated during use. Movement of the switch 10 may allow the switch to backout of the opening 12. If a cover is placed on top of the facing 18, the movement of the switch 10 may allow the actuator 20 to be trapped beneath the cover when the actuator is engaged. Trapping the actuator 20 beneath the cover may inhibit proper functioning of the switch 10. A large gap and an ability of the switch 10 to move within the gap may also lead to stack-up tolerance problems during assembly of the system.

In certain applications, the outermost edges 26 of snap lock mechanisms 22 may contact walls formed by the opening 12 when the switch 10 is fully inserted into the panel 14. Such a situation may occur when the switch 10 is attached to a thick walled panel or support structure, or when the switch is attached to a support structure (not shown in FIG. 1) such that the facing bottom surface 28 does not contact the panel when the switch 10 is fully inserted into the panel. In such a situation, the walls may inhibit complete actuation of the snap lock mechanisms 22. The switch 10 may be held in the opening 12 only by a frictional connection between the edges 26 of the snap lock mechanisms 22 and the walls forming the opening. A switch 10 held in such a manner may backout of the opening 12 during normal use. If a cover is placed on top of the facing 18, the cover may inhibit the switch 10 from backing out, but the actuator 20 may become trapped beneath the cover during use. Trapping the actuator 20 beneath the cover may inhibit proper functioning of the switch 10.

Inserting a switch 10 into a panel 14 or support structure may cause stresses to be applied to the panel and to the switch. Additional stress may be imparted to the switch 10 and to the panel 14 during normal use of the switch. The stress may bow or crack the panel 14 or a cover coupled to the panel. It is desirable to relieve some of the stress applied to a system due to the insertion of a switch into the system.

SUMMARY OF THE INVENTION

The problems outlined above may in large part be solved by a mounting system that may be used to attach a switch to a mounting structure of an electronic system. In an embodiment, snap lock mechanisms may be attached to sides of a body of the switch. Alternately, snap lock mechanisms may be formed as integral portions of sides of a body of a switch. When the switch is inserted into an opening in the mounting structure, engaging surfaces of the snap lock mechanisms may contact undercut portions of the mounting structure. In an embodiment, the opening may include channels. The snap lock mechanisms attached to the switch may fit within the channels so that the remaining portion of the opening may have a shape that closely conforms to a shape of the body of the switch.

In an embodiment, the mounting structure may be a support structure of the electronic system. The mounting structure may include a plurality of structural openings. A gap may be formed between an opening for the switch and a structural opening. The gap may relieve some stress placed on the electronic system when the switch is inserted into the mounting structure. The gap may relieve stress placed on the electronic system and the switch when the switch is actuated. The gap may also allow for easier manipulation of wiring that electrically couples the switch to the electronic system during installation of the switch. A cover or enclosure panel may be attached to the mounting structure to provide a portion of the electronic system enclosure. In an alternate embodiment, the mounting structure may be an enclosure panel of the electronic system.

The switch may be any type of switch that includes one or more snap lock mechanisms attached to a body of the switch. The switch may be, but is not limited to a rocker switch, a toggle switch, a rotary wheel switch, or a push switch. The electronic system may be any type of electronic system including, but not limited to a computer system, a printer, laboratory equipment, or audio equipment.

An advantage of the mounting system may include that a switch may be mounted to an opening in a thick wall panel while substantially inhibiting backout of the switch from the panel. The switch may be securely held to a panel or mounting structure by force between an engaging surface of the snap lock mechanism and a shoulder formed by an undercut portion in the panel or mounting structure.

Another advantage of the mounting system may be that channels in the opening that accept snap lock mechanisms may allow the remainder of the opening to more closely conform to a perimeter shape of a body of a switch. A close conformance between the perimeter of the switch body and the opening may inhibit movement of the switch during use of the switch. The close conformance may inhibit an actuator of a switch from being trapped beneath a cover attached to the mounting system during use. The close conformance between the perimeter of the switch body and the opening may also minimize stack up tolerance problems associated with positioning the switch within an electronic system.

Yet a further advantage of the mounting system for the switch may be that the mounting system may not require separate component fasteners, such as screws, in addition to the snap lock mechanism or mechanisms. In certain embodiments, separate component fasteners may be used in addition to a snap lock mechanism or mechanisms. Further advantages of the mounting system may include that the system is sturdy, durable, light weight, simple, safe, efficient, versatile, ecologically compatible, energy conserving and reliable; yet is inexpensive and easy to manufacture, install, maintain and use.

Figure 1:
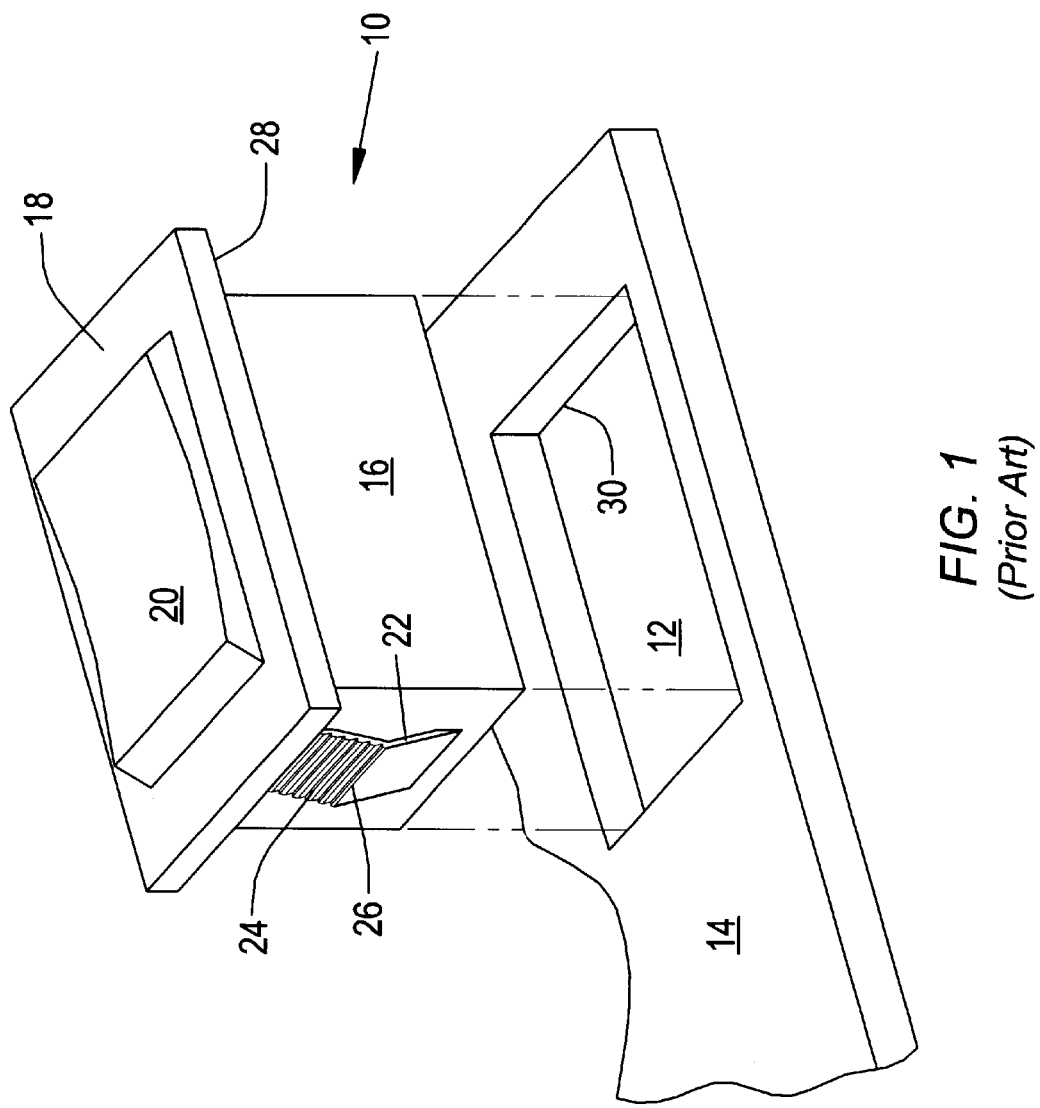
FIG. 1 is a partial perspective view of an opening in a panel together with a switch that may be inserted into the opening.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the claims.

DETAILED DESCRIPTION OF THE PREFERRED EMBODIMENTS

Figure 5:
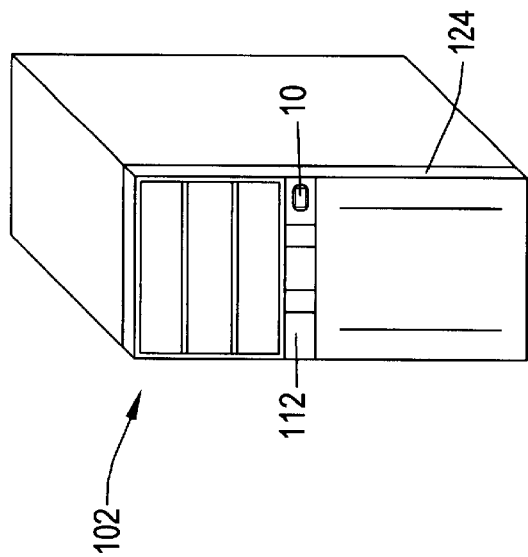
FIG. 5 is a perspective view of an electronic system with a mounted switch.
Figure 2:
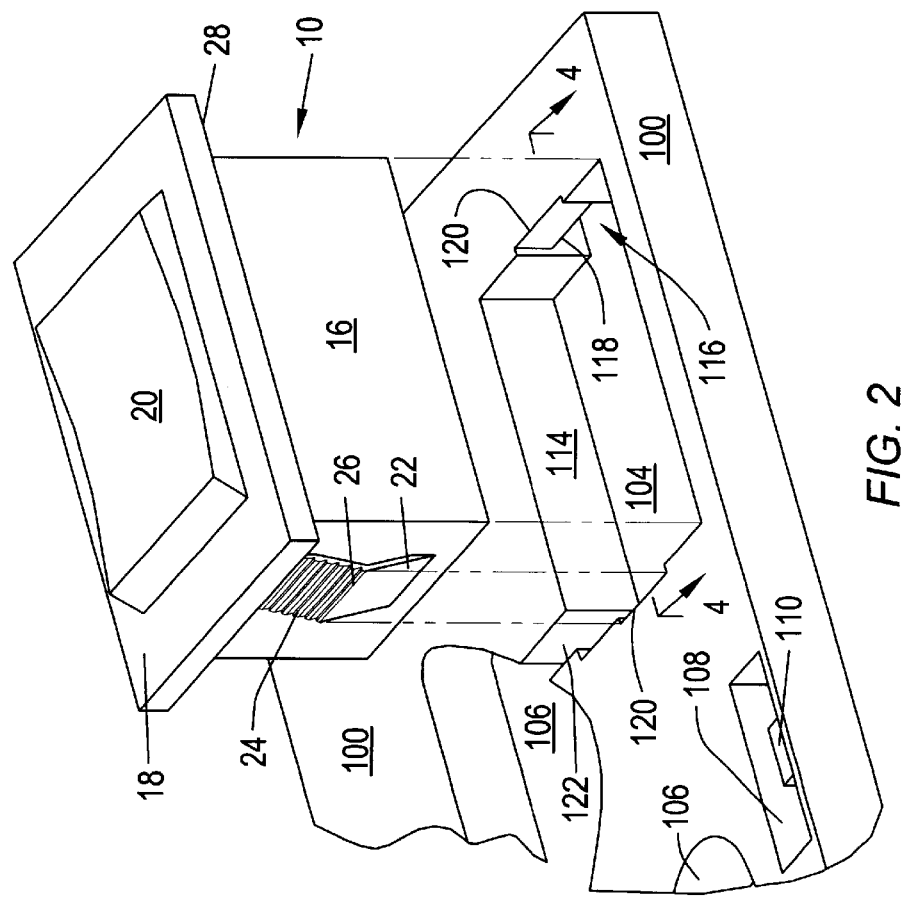
FIG. 2 is a partial perspective view of a front surface of an opening in a mounting structure together with a switch that may be inserted into the opening.
Figure 3:
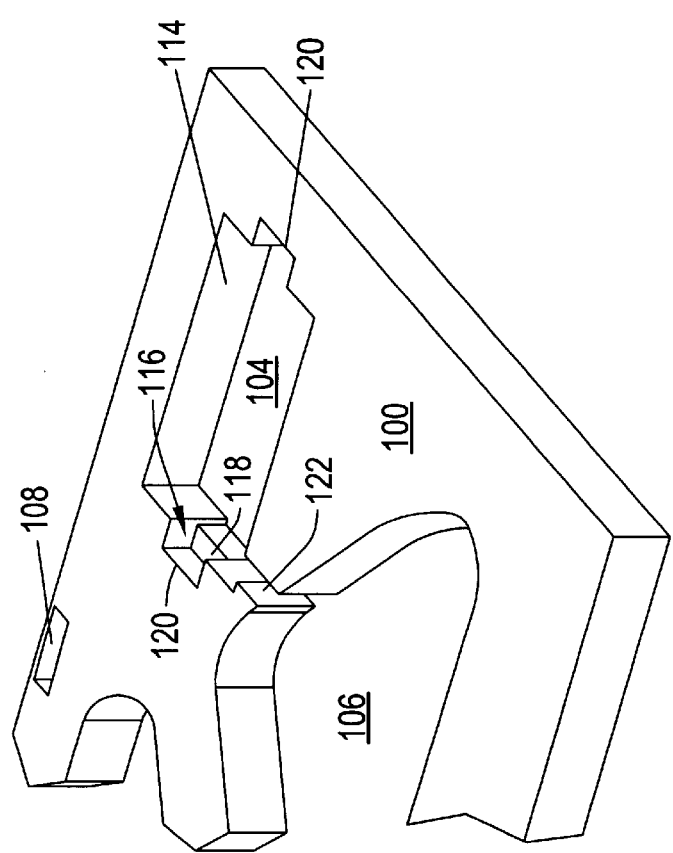
FIG. 3 is a partial perspective view of a back surface of an opening in a mounting structure.

With reference to the drawings, and particularly to FIGS. 2 and 3, embodiments of mounting structures are designated generally as 100. A mounting structure 100 may allow a switch 10 to be securely mounted within an electronic system 102. An example of an electronic system 102 is illustrated in FIG. 5. The mounting structure 100 may be formed of plastic, metal, or other suitable structural material. In certain embodiments, the mounting structure 100 may be part of an interior support structure or chassis for the electronic system 102. In certain embodiments, the mounting structure 100 may be an exterior panel of the electronic system 102. A switch 10 may be inserted into opening 104 in the mounting structure 100. The opening 104 may be molded into the mounting structure 100. Alternately, the opening 104 may be cut into the mounting structure 100 after the mounting structure is formed. FIGS. 2 and 3 show opening 104 in a mounting structure 100. The phantom lines in FIG. 2 show where a snap lock mechanism 22 and corners of a switch 10 may be positioned when the switch is inserted into an opening 104 in a mounting structure 100.

A mounting structure 100 may optionally include structural openings 106, recesses 108 and tabs 110 in addition to the opening 104. The structural openings may reduce the weight of the mounting structure 100. The structural openings may also provide added strength to the mounting structure 100. The recesses 108 and tabs 110 may be located at several places on the mounting structure 100. The recesses 108 and tabs 110 may allow a cover 112 (shown in FIG. 6) to be attached to the mounting structure 100. The cover 112 would include male members (not shown) that could be positioned in the recesses 108 to engage the tabs 110 and secure the cover to the mounting structure 100. Other fastening systems that may include, but are not limited to, threaded fasteners, snap lock mechanisms or glue, may be used to attach a cover 112 to a mounting structure 100.

Figure 4:
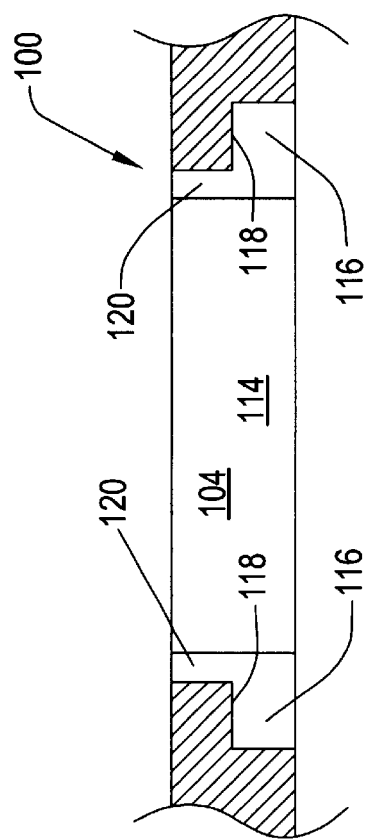
FIG. 4 is a cross sectional view of an opening in a mounting structure taken substantially along plane 4—4 of FIG. 2.

An opening 104 in a mounting structure 100 may define walls 114 in the mounting structure. Walls 114 of the mounting structure 100 that couple to snap lock mechanisms 22 when a switch 10 is inserted into the opening 104 may include undercut portions 116. FIG. 4 shows a cross sectional view of a mounting structure 100 that emphasizes undercut portions 116. The undercut portions 116 may form shoulders 118 in the mounting structure 100. Engagement surfaces 24 of snap lock mechanisms 22 may contact the shoulders 118 when a switch 10 is inserted into the opening 104. Contact between the shoulders 118 and the engagement surfaces 24 may inhibit removal of a switch 10 from an opening in a mounting structure 100. The undercut portions 116 may allow engagement surfaces 24 of snap lock mechanisms 22 to hold a switch 10 in the opening 104 when a thickness of the mounting structure 100 is greater than a vertical distance between a bottom surface 28 of the switch facing 18 and a lowermost engaging surface 24.

An opening 104 in a mounting structure 100 may be sized slightly larger than a perimeter of a body 16 of a switch 10 that will be mounted in the opening. The opening 104 may include channels 120. The channels 120 may have widths that are slightly larger than widths of snap lock mechanisms 22 that are attached to a body 16 of the switch 10. The channels 120 may allow the remaining portion of the opening 104 to closely correspond to the perimeter of the body 16 of the switch 10. A close correspondence between the opening 104 and the perimeter of the body 16 may inhibit movement of the switch 10 when the switch is inserted into the opening. The undercut portions 116 of the mounting structure 100 may be formed in walls 114 of the channel 120.

A mounting structure 100 may also include gap 122 between an opening 104 and a structural opening 106. The gap 122 may allow an opening 104 to expand when a switch 10 is inserted into the opening. Expansion of the opening 104 may relieve stress developed during insertion of the switch 10 into the opening. The gap 122 may also partially relieve stress transmitted to the switch 10 and the mounting structure 100 during use of the switch. Relieving a portion of stress associated with the switch 10 may prevent bowing or splitting of the mounting structure 100. Relieving a portion of the stress associated with the switch 10 may also prevent bowing or splitting of a cover 112 coupled to the mounting structure 100.

A mounting structure 100 may be used to attach a switch 10 to an electronic system 102. The switch 10 may be any type of switch that can be mounted to an electronic system by at least one snap lock mechanism 22 attached to a body 16 of the switch. The type of switch may include, but is not limited to a rocker switch, a toggle switch, a rotary wheel switch, or a push switch. The electronic system 102 may be any type of electronic system including, but not limited to computer systems, printers, laboratory equipment, and audio equipment.

Figure 6:
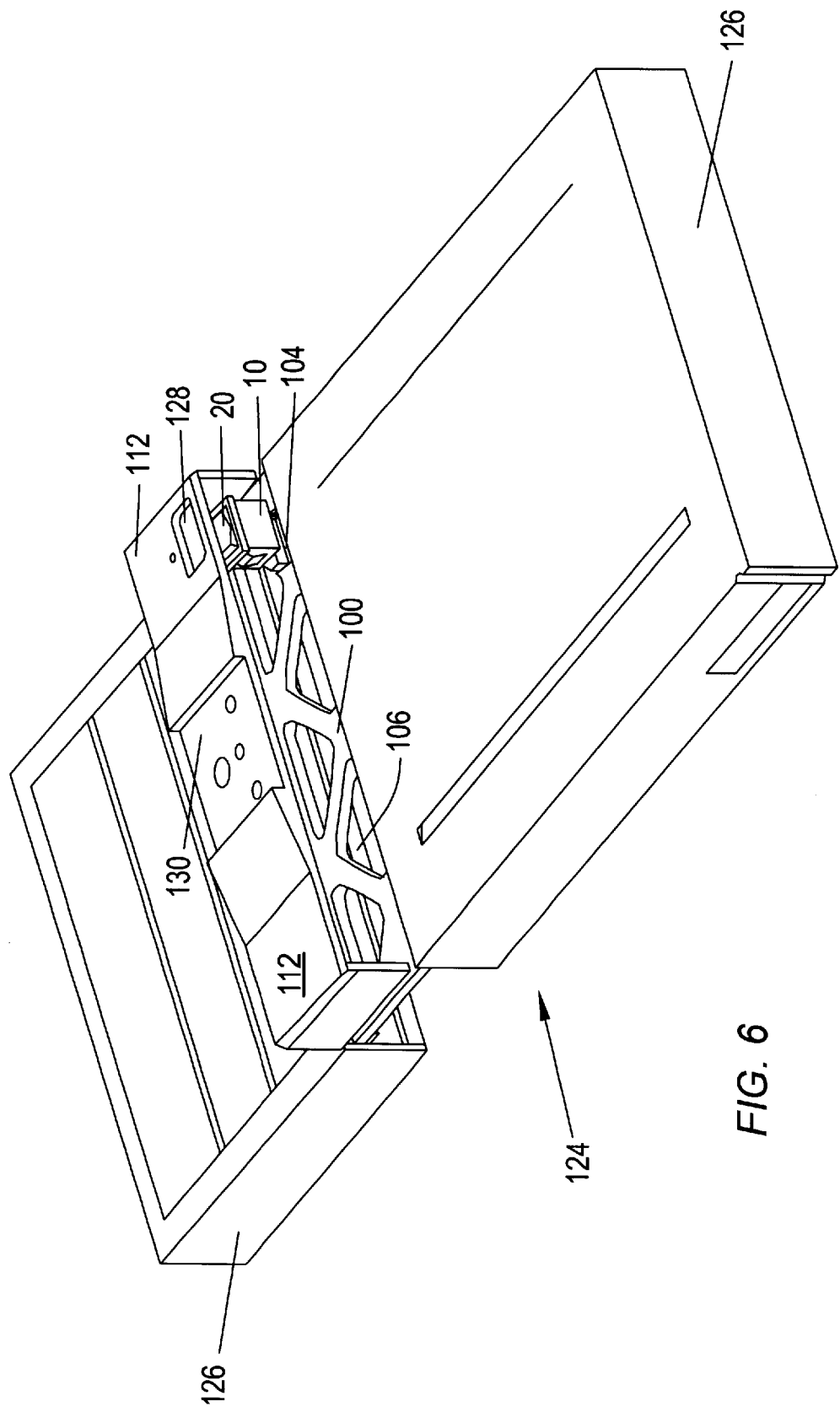
FIG. 6 is a perspective view of a partially assembled enclosure panel for the electronic system shown in FIG. 5.

FIG. 5 shows an example of an embodiment of an electronic system 102. The electronic system 102 illustrated is a computer system. The computer system may include enclosure panel 124 and switch 10. FIG. 6 shows a partially assembled enclosure panel 124 and switch 10 for the computer system shown in FIG. 5. A mounting structure 100 for the switch 10 is partially visible in FIG. 6. It is to be understood, however, that a mounting structure may be used with any type of electronic system, and that a particular electronic system and mounting structure may not resemble the computer system and mounting structure illustrated in FIGS. 5 and 6.

FIG. 6 shows an embodiment of a partially assembled enclosure panel 124. The enclosure panel 124 may include frame 126, mounting structure 100, and cover 112. The frame 126 may be attached to other enclosure panels and structure (not shown) to form a housing for the electronic system 102. The mounting structure 100 may provide a mount for a switch 10. The mounting structure 100 may also help to make the enclosure panel 124 rigid.

Cover 112 may be coupled to a mounting structure 100 to form a part of an enclosure for an electronic system 102. The cover 112 may also include switch opening 128 for a switch actuator 20 and indicia mounting surface 130.

To attach a switch 10 to a mounting structure 100, the switch may be positioned over opening 104 in the mounting structure. If the opening 104 has channels 120 for the snap lock mechanisms 22 of the switch 10, the snap lock mechanisms may be positioned adjacent to the channels. The switch 10 may then be forced into the opening 104 to secure the switch to the mounting structure 100. Forcing the switch 10 into the opening 104 may compress the snap lock mechanisms 22 of the switch. The outermost edges 26 of the snap lock mechanisms 22 may contact walls 114 of the opening 104 and pass beneath the undercut portions 116 of the mounting structure 100 during insertion of the switch 10 into the opening 104. When the outermost edges 26 pass beneath the undercut portions 116, the snap lock mechanisms 22 may expand so that engaging surfaces 24 of the snap lock mechanism contact shoulders 118 formed by the undercut portions. When the switch 10 is fully inserted into the mounting structure 100, engaging surfaces 24 of the snap lock mechanisms 22 may contact the shoulders 118 and inhibit removal of the switch from the mounting structure 100.

The switch 10 may be removed from the mounting structure 100 by inserting a tool against the snap lock mechanism 22. The tool will compress the snap lock mechanisms 22 and disengage the engaging surfaces 24 from the shoulders 118. The switch 10 may then be lifted out of the opening 104.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements and compositions described herein or in the features or in the sequence of features of the methods described herein without departing from the spirit and scope of the invention as described in the following claims.

What is claimed is:

1. A mounting system for a switch of an electronic system, comprising:
   a support structure in the electronic system;
   a first opening in the support structure, the first opening sized to allow a body of the switch to be inserted into the support structure;
   an undercut shoulder in the support structure abutting the opening, the undercut shoulder configured to contact an engagement surface of a snap lock mechanism coupled to the body of the switch;
   a second opening in the support structure adjacent to the first opening; and
   a gap in the support structure that joins the first opening to the second opening, wherein the gap is configured to relieve stress in the support structure due to insertion of the switch into the support structure.

2. The mounting system of claim 1, wherein a portion of the first opening adjacent to the undercut comprises a channel, and wherein the channel is configured to accommodate insertion of the snap lock mechanism into the channel.

3. The mounting system of claim 1, wherein the switch comprises a rocker switch.

4. The mounting system of claim 1, further comprising a cover coupled to the support structure.

5. The mounting system of claim 1, wherein the electronic system comprises a computer system.

6. The mounting system of claim 1, wherein the electronic system comprises a printer.

7. A system for coupling a switch to an electronic system, comprising:

a snap lock mechanism coupled to a body of the switch;

a support coupled to the electronic system;

a first opening in the support, the first opening configured to accept insertion of the body;

a channel in a wall of the support, the channel adapted to allow insertion of the snap lock mechanism into the channel; and a shoulder formed in a wall of the channel, the shoulder configured to contact an engaging surface of the snap lock mechanism during use.

8. The system of claim 7, wherein the switch comprises a rocker switch.

9. The system of claim 7, wherein the electronic system comprises a computer system.

10. The system of claim 7, wherein the electronic system comprises a printer.

11. The system of claim 7, further comprising a cover coupled to the support.

12. The system of claim 7, further comprising a second opening adjacent to the first opening, and a gap in the support joining the first opening to the second opening, wherein the gap is configured to relieve stress in the support due to insertion of the switch into the support during use.

13. A method of attaching a switch having a snap lock mechanism to a system, comprising:

inserting the switch into a first opening in a support structure of the system in a first direction;

relieving stress from the support structure caused by insertion of the switch into the opening; and contacting an engaging surface of the snap lock mechanism against a shoulder formed in a wall of the support structure to attach the switch to the support structure.

14. The method of claim 13, wherein the switch comprises a rocker switch.

15. The method of claim 13, wherein the system comprises a computer system.

16. The method of claim 13, wherein the system comprises a printer.

17. The method of claim 13, wherein inserting the switch into the first opening further comprises positioning the snap lock mechanism in a channel of the first opening and forcing the switch and snap lock mechanism into the support structure.

18. The method of claim 13, wherein relieving the stress comprises expanding a gap located between the first opening and a second opening.

19. The method of claim 13, wherein inserting the switch comprises compressing a portion of the snap lock mechanism to allow the snap lock mechanism to pass below the support structure.

20. The method of claim 19, further comprising expanding the lock mechanism when the lock mechanism is below the support structure so that the snap lock mechanism inhibits removal of the switch from the support structure in a direction opposite to the first direction.

* * * * *